US010440187B1

(12) United States Patent
Mandel et al.

(10) Patent No.: US 10,440,187 B1
(45) Date of Patent: *Oct. 8, 2019

(54) BOOTSTRAPPED PREDICATIVE ROUTING IN CRM

(71) Applicant: Directly Software, Inc., San Francisco, CA (US)

(72) Inventors: Eugene Mandel, Sebastopol, CA (US); Alex Sherstinsky, Hillsborough, CA (US); Eduardo González Ponferrada, San Francisco, CA (US)

(73) Assignee: Directly Software, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/123,977

(22) Filed: Sep. 6, 2018

Related U.S. Application Data

(63) Continuation-in-part of application No. 15/476,789, filed on Mar. 31, 2017.

(60) Provisional application No. 62/446,826, filed on Jan. 16, 2017, provisional application No. 62/471,305, filed on Mar. 14, 2017.

(51) Int. Cl.
*H04M 3/523* (2006.01)
*H04M 3/51* (2006.01)
*G06N 20/00* (2019.01)

(52) U.S. Cl.
CPC .......... *H04M 3/5235* (2013.01); *G06N 20/00* (2019.01); *H04M 3/5183* (2013.01); *H04M 3/5233* (2013.01)

(58) Field of Classification Search
CPC ........................... G06N 99/005; G06Q 30/016
USPC ............................... 379/265.01, 266.01, 309
See application file for complete search history.

(56) References Cited

U.S. PATENT DOCUMENTS

| | | | |
|---|---|---|---|
| 7,372,952 B1 * | 5/2008 | Wu | H04M 3/5233 370/352 |
| 2005/0002502 A1 * | 1/2005 | Cloran | G06Q 10/06311 379/88.18 |

* cited by examiner

*Primary Examiner* — Quynh H Nguyen
(74) *Attorney, Agent, or Firm* — Royse Law Firm, PC

(57) ABSTRACT

In a crowd sourcing approach, responses to customer service inquiries are provided by routing a subset of the inquiries to an independent group of experts. The customer service inquiries are optionally routed to specific experts based on matches between identified subject matter of the inquiries and expertise of the experts. Embodiments include methods of classifying customer service inquiries, training a machine learning system, and/or processing customer service inquiries. Customer service inquiries and answers from a first enterprise and/or industry are optionally used to train an inquiry classifier for a second enterprise and/or industry. The classifier being configured to predict if a new customer service inquiry will require access to confidential information for a human to generate an answer that resolves the inquiry.

21 Claims, 3 Drawing Sheets

BOOTSTRAPPED PREDICATIVE ROUTING IN CRM

CROSS-REFERENCE TO RELATED APPLICATIONS

This application is a continuation-in-part of U.S. patent application Ser. No. 15/476,789 filed Mar. 31, 2017, which in turn claimed priority and benefit of U.S. provisional patent applications Ser. No. 62/446,826 filed Jan. 16, 2017 and Ser. No. 62/471,305 Filed Mar. 14, 2017. This application is related to U.S. patent application Ser. No. 15/138,166 filed Apr. 25, 2016 and U.S. patent application Ser. No. 14/619,012, filed Feb. 10, 2015. The contents of all of the above provisional and non-provisional patent applications are hereby incorporated herein by reference.

BACKGROUND

Field of the Invention

The invention is in the field enterprise information management, and more specifically in the field of routing and managing customer service inquiries, and/or other types of workflow activities.

Related Art

Typical customer service systems include a contact center configured to communicate with customers by voice, chat, video, text, email, social media, and/or other channels. These systems often include a series of questions that are presented to a customer and configured to identify the customer's needs. For example, a customer calling to a contact center may be asked to enter numbers on their phone to route the call to a specific group of service personnel. The customer is typically placed in a queue and then transferred to the next available service person. Such contact centers are expensive to establish and maintain.

SUMMARY

Some embodiments of the current invention include systems and methods of providing improved customer service. These improved services are achieved by processing and potentially resolving customer service inquiries prior to or after these inquiries have been routed to a contact center. The processing includes presenting the customer service inquiries to one or more "experts." These experts may be independent persons having experience or qualifications in the subject of the customer service inquiry. Optionally, customer service inquiries that are not resolved by an expert are eventually forwarded to agents in an enterprise contact center.

Experts are managed by computing systems configured to determine which expert should receive a particular customer service inquiry, to determine which experts are currently available, to manage rewards, and/or to generate expert scores. Customer service inquiries are routed by the computing systems to establish communication channels between the expert and source of the service inquiry. These computing systems are thus configured via specific computing instructions to produce a specific purpose computing system.

Various embodiments of the invention include a method of processing customer service requests, the method comprising: receiving a customer service inquiry; placing the customer service inquiry in a queue for processing; pre-classifying the customer service inquiry; routing the customer service inquiry according to the pre-classification of the customer service inquiry; classifying the customer service inquiry according to whether it can be answered by an automated response logic, by an internal expert, or by an external expert, in the alternative; routing the customer service inquiry to be answered by the automated response logic, by the internal expert or the external expert, according to the classification of the customer service inquiry; and generating a response to the customer service inquiry using the automated response logic, by the internal expert or the external expert; and providing the response to a source of the customer service inquiry.

Various embodiments of the invention include an expert management system comprising: a request I/O configured to receive a customer service inquiry; an inquiry parser configured to determine one or more topic characteristics of the inquiry; expert data storage configured to store data characterizing one or more specialty characteristics of each of the plurality of experts; matching logic configured to match the inquiry to a first human expert of the plurality of human experts, the matching being based on a correlation between the topic characteristics of the inquiry and the specialty characteristics of the first human expert; routing logic configured to route the inquiry to the first human expert if the customer service inquiry is in informational inquiry and to route the inquiry to a customer service center if the customer service inquiry is a transactional inquiry, the routing logic including a classifier configured to classify the customer service inquiry as alternatively a transaction inquiry or an informational inquiry.

Various embodiments of the invention include a machine learning system comprising: an I/O configured to receive answers to the customer service inquiries, each of the answers being associated with one or more customer service inquiries; cluster detection logic configured to identify clusters of the answers based on distance between the answers in a vector space; cluster classification logic configured to categorize each of the clusters of the answers based on presence of transactional answers within each of the respective clusters; and training logic configured to train a classifier using the categorized clusters of answers, the classifier being configured to receive a customer service inquiry and to predict whether the customer service inquiry will require a transactional answer to be resolved.

Various embodiments of the invention include a method of training an inquiry classifier, the method comprising: receiving a plurality of customer service inquiries and answers to the customer service inquiries; vectorizing the received answers in a vector space; vectorizing the received inquiries in a vector space; clustering the answers based on distances between the answers in the vector space to produce a plurality of answer clusters, each of the answers within a member of the plurality of answer clusters being associated with a respective customer service inquiry; classifying each of the clusters as transactional or instructional clusters based on a nature of answers included with each of the clusters; and training a classifier based on the classification of each cluster as transactional or instructional and the inquiries associated with answers included in each of the clusters.

BRIEF DESCRIPTION OF THE DRAWINGS

FIG. 4 illustrates methods of training an inquiry classifier, according to various embodiments of the invention.

DETAILED DESCRIPTION

Figure 1:
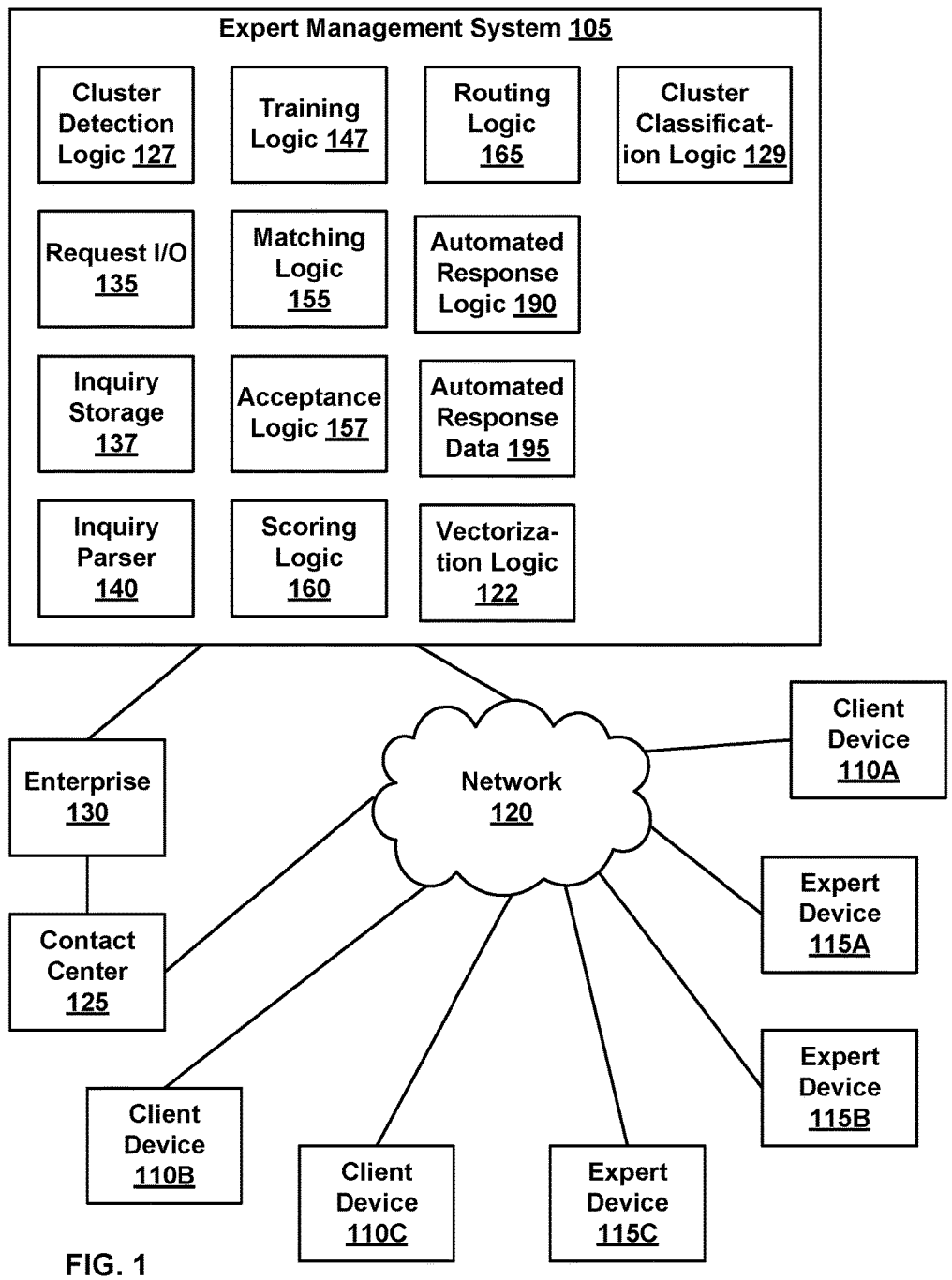
FIG. 1 illustrates customer service architecture, according to various embodiments of the invention.

The systems and methods described herein are directed toward the resolution of customer service inquiries. For example, they may be used to generate one or more responses to a customer service inquiry. The customer service inquiry may be received directly from a customer or prospective customer ("a requester"). Alternatively, the customer service inquiry may be first communicated from a requester to a customer contact center (e.g., call center) and then forwarded from the contact center to the expert management systems described elsewhere herein. The inquiries are resolved by first routing the inquiries to an expert management system and then, if needed, the inquiries are routed to a contact center. The routing is based on a rule set that is configured to reduce the number of inquiries received by the contact center while, at the same time, assuring minimum levels of response quality, response time, and/or customer satisfaction. These rules are optionally embodied in a trained artificial intelligence, neural network, and/or machine learning system. Typically, resolving inquiries using the expert management system is more cost effective than having the inquiries resolved by the contact center. As used herein the term "machine learning system" is meant to include expert systems, artificial intelligence systems, artificial neural networks, Bayesian statistical processors, decision trees (e.g., Random Forest or XGBoost), adversarial reinforcement learning systems, and/or the like.

While a contact center is typically managed or under contract with a specific enterprise, experts managed by the expert management system can be independent persons having expertise in one or more topics. For example, an expert in a cellular telephone service may be an experienced user or a current/former employee of a telephone company. The plurality of experts forms a support and/or service community having a diverse range of expertise. Communication with experts may be via the internet and/or other communication service. For example, an expert may provide customer service via a personal computer, tablet computer, or cellular telephone. Communication between a requester and an expert can be via telephone, voice over Internet Protocol (VoIP), text session, video, email, chat, video-chat, video-conference, mobile application, etc. Further, such communication can be made using massages systems such as Slack, Facebook Messenger, ZopIM, LivePerson, WeChat, etc. Both requesters and experts are examples of "users" of the system.

Certain terms are defined herein to have specific meanings. As these terms are used herein in the specification and claims, these terms are meant to be inherently limited by the definitions provided. Specifically, as used herein:

A "customer service inquiry" is defined as a request for help, assistance, support or some other type of service. Customer service inquiries can include technical service, sales service, advice, reviews, geographic directions, assembly directions, customer service and/or the like. Customer service inquiries may originate from an individual or a business that wishes to know about, consumes or potentially consumes a product or service. Customer service inquiries are sometimes referred to herein as "service inquiries" or simply "inquiries" where the context is clearly referring to customer service inquiries. Inquiries may be requests for services or information.

A "requester" is a person or enterprise that submits a customer service inquiry using a communication device.

An "expert" is defined as a person that makes him or herself available to provide responses (e.g., answers) to customer service inquiries. Experts can have different specialty characteristics, which denote topics in which the expert has expertise. In some embodiments, experts may have different levels of certification. For example, a "certified expert" may be one that is acknowledged by an enterprise to have specialty characteristics in the activities of that enterprise. In one embodiment, an airline certifies outside experts as having specialty characteristics in the airline's reservation system. A certified expert may be certified on the basis of having passed a test such as a language test or a technical skill test, and/or on the basis of having completed specific training. These experts may be former employees of the airline and/or have been trained by the airline. An internal expert is an enterprise employee or some other person that is provided with access to customer and/or account information that is generally not public. For example, if an enterprise is a bank, then an internal expert may be a contractor to whom the bank has given access to selected customer account information.

A "contact center" is defined as a facility populated by service personnel consisting of employees of an enterprise or employees of contractors to the enterprise for the purpose of responding to customer service inquiries. Contact centers may support one or more specific enterprise and normally have a set number of service personnel available to answer service inquiries at any given time. Contact centers may communicate with requesters by phone, chat, text and/or email. The service personnel of a contact center are directly or indirectly under the control of an enterprise that pays for the service personnel to answer service inquiries and control the contents of the answers provided. One example of a contact center is a traditional call center.

An "enterprise" is defined as a business or other organization that would normally receive customer service inquiries relating to products or services of the enterprise. Examples of enterprises include corporations, product and service companies, professional organizations, political organizations, unions, non-profits, and/or academic or scientific institutions. Enterprises may have their own contact centers or may contract contact center services from third parties. In either case, the enterprises typically have control over the activities over contact center personnel. For example, the Enterprise will define answers to be given to specific questions.

An "answer" is the content of a response to a customer service inquiry and is intended to resolve the inquiry, ask for explanation or further details of the inquiry, and/or provide the requester with options relating to resolution of the inquiry.

A "partial response" is a response to be modified and/or approved by a human expert. Partial responses can include, for example, templates for answers, suggested answer contents, answers that require filtering of personal information, answer outlines, answer suggestions, and/or the like. A partial answer includes an answer that requires further action by a human agent. For example, a partial response may be approved, edited, and/or otherwise modified by a human expert prior to being provided to a requestor. In contrast, a "complete response" is a response ready to be provided to a source of a customer service inquiry.

FIG. 1 illustrates a Customer Service Architecture 100, according to various embodiments of the invention. Customer Service Architecture 100 includes an Expert Management System 105 configured to communicate with a plurality of Client Devices 110 and a plurality of Expert Devices 115 via a Network 120. Client Devices 110 and Expert Devices 115 are individually referenced as A, B, C, etc. The numbers of Client Devices 110 and Expert Devices 115 illustrated in FIG. 1 are for illustrative purposes; typically Customer Service Architecture 100 is configured to service much larger numbers of Client Devices 110 and Expert Devices 115. Expert Management System 105 is optionally further configured to communicate with a Contact Center 125 and/or an Enterprise 130. These communications are optionally via Network 120.

Client Devices 110 are the communication devices of a person sending a customer service inquiry. These communication devices can include, for example, a personal computer, a telephone, a cellular telephone, a tablet computer, a vending device, an interactive advertisement, a terminal, a point of sale system, a kiosk, and/or the like. Client Devices 110 enable communication modes such as voice, text, email, video, MMS (multimedia messaging), and/or the like. Client Devices 110 are optionally configured to communicate through a web browser. Client Devices 110 optionally include an application specifically configured for communicating with Expert Management System 105 and/or Contact Center 125.

Expert Devices 115 are the communication devices of experts. Expert Devices 115 can include the same types of devices as discussed herein with respect to Client Devices 110. In some embodiments, an expert may have a plurality of different devices the expert uses to response to customer service inquiries. For example, one expert may use a personal computer, a tablet computer and a cellular phone to communicate with Clients 110 and/or Expert Management System 105. Expert Devices 115 optionally use a browser or custom application for this communication.

Network 120 is a communication network such as the internet, a wide area network, a cellular network, a telephone network (POTS), a satellite network, a cable network, and/or the like. Network 120 may include wired and wireless segments.

Expert Management System 105 includes a Request I/O 135 configured to receive customer service inquiries and communicate with Contact Center 125, Client Devices 110 and Expert Devices 115.

Expert Management System 105 optionally further includes an Inquiry Storage 137. Inquiry Storage 137 includes memory such as RAM, SRAM, a hard drive, flash memory, an optical drive, etc. Inquiry Storage 137 optionally further includes data structures specifically configured to store customer support inquiries. This data structure may be part of a database and/or data warehouse.

Expert Management System 105 further includes an Inquiry Parser 140 configured to parse received customer service inquiries. Inquiry Parser 140 includes computer implemented logic configured to automatically parse each customer service inquiry and determine one or more topic characteristics of the inquiry, without human analysis. Inquiry Parser 140 includes hardware, firmware and/or software stored on a non-transient computer readable medium. Topic characteristics are characteristics of the service inquiry that are indicative of the topic(s) of the service inquiry. For example, topic characteristics may include information regarding a source of the service inquiry, metadata characterizing text within the service inquiry, account information, keywords within the service inquiry, and/or the like. Examples of topic characteristics include questions regarding specific software or hardware, business services, reservations, bill payment, account services, how to do something, medical questions, installation procedures, advice, appointments, professional recommendations, etc.

In some embodiments, Inquiry Parser 140 is configured to identify a source of the customer service inquiry and to infer topic characteristics of the service inquiry based on the identity of the source. For example, if a service inquiry arises from a member of Client Devices 110 that includes a kiosk in a retail store of a cellular telephone company, then Inquiry Parser 140 can infer that the topic of the customer service inquiry is related to the cellular telephone company. In another example, if the customer service inquiry is received from a webpage hosted by an electronics retailer, then Inquiry Parser 140 can infer that the topic of the customer service inquiry is related to the products of the electronics retailer, or to a specific product displayed on the webpage.

Inquiry Parser 140 optionally includes a natural language processing engine to determine one or more topic characteristics of a customer service inquiry.

Typically, internal experts are authorized to receive a greater amount of customer information relative to external experts. For example, internal experts may be authorized to access confidential financial data, account numbers, social security numbers, medical information, order history, customer data (telephone number, address, name, etc.), and/or the like, while external experts are not thus authorized. Internal experts may also be authorized to take actions for which external experts are not authorized. For example, an internal expert may be authorized to give a customer credit, to authorize a payment, to make a reservation, to accept an order, to electronically access a customer's device, and/or the like. The classification of experts need not be binary. For example, there can be multiple levels of expert authorization and/or capabilities. The authorization of an expert may be specified by an organization (e.g., Enterprise 130) to whom a customer service inquiry is directed, or may be specified by a third party certification process. Such authorization may be made based on training and/or certification of the expert.

Expert Management System 105 optionally further includes Vectorization Logic 122. Vectorization Logic 122 is configured to encode customer service inquiries and/or answers to customer service inquiries into a vector space such that a distance between encoded text having similar meaning and/or belonging to a same topic are closer together in the vector space than encoded text of different meaning and topics. Inquiries and answers are typically vectorized in different vector spaces. Examples, of algorithms included in Expert Management System 105 that use text processed by Vectorization Logic 122 include DBSCAN (https://en.wikipedia.org/wiki/DBSCAN) or K-Means (https://en.wikipedia.org/wiki/K-means_clustering).

In some embodiments, Vectorization Logic 122 is configured to, given topics a and b, produce a vector encoding such that:

$$\frac{1}{N_a(N_a-1)}\sum_{i=1}^{N_a}\sum_{j=1,j\neq i}^{N_a} d(X_a^i, X_a^j) \ll \frac{1}{N_a N_b}\sum_{i=1}^{N_a}\sum_{j=1}^{N_b} d(X_a^i, X_b^j)$$

$N_a$ being the number of answers to topic a, $N_b$ being the number of answers to topic b, $X_t^k$, the k-th sample topic t, and d(a,b) a distance metric between two vectors such as the cosine distance:

$$d(a, b) = 1 - \frac{\sum_{i=1}^{n} a_i b_i}{\sqrt{\sum_{i=1}^{N} a_i^2} \sqrt{\sum_{i=1}^{N} b_i^2}}$$

Vectorization Logic 122 is optional in embodiments wherein answers and inquiries are received in a vectorized form.

Expert Management System 105 optionally further includes Cluster Detection Logic 127. Cluster Detection Logic 127 may be configured to determine if a customer service request is a member of a cluster of customer service requests. "Clusters" are groups of customer service inquiries having similar topics and/or requiring similar responses. For example, a cluster of customer service inquiries may all be associated with a password change or with an account balance request. Clusters may be groups of inquiries and/or inquiry answers that have been vectorized using Vectorization Logic 122 and found to be close in a vector space relative to other inquiries and/or inquiry answers. The information used to determine if a particular customer service inquiry is a member of a cluster includes, for example, a source of the customer service inquiry, images within the customer service inquiry, metadata associated with the customer service inquiry, and/or text within the customer service inquiry. In addition, Cluster Detection Logic 127 optionally attempts to obtain a greater understanding of the content a customer service inquiry, relative to Inquiry Parser 140. For example, Cluster Detection Logic 127 may employ a natural language processor to obtain a more accurate understanding of the text within a customer service inquiry.

Cluster Detection Logic 127 can include a trained machine learning system, e.g., a neural network or artificial intelligence system. This machine learning system is optionally trained using prior inquiries and responses as described elsewhere herein. In some embodiments, Cluster Detection Logic 127 is configured to identify new clusters in which customer service inquiries can be included. This identification can be based on customer service inquiries and/or responses to these inquiries. For example, if a number of inquiry responses include instructions on cancelling a reservation or subscription, then Cluster Detection Logic 127 may examine the customer service inquiries that resulted in these inquiry responses and identify characteristics of the inquiries that can be used to categorize them into a cluster. In some embodiments, a new cluster identified by Cluster Detection Logic 127 must be approved by an internal or external expert prior to use in classifying additional customer service inquiries.

Cluster Detection Logic 127 may be configured to detect clusters of answers to customer service inquiries. In these embodiments, Cluster Detection Logic 127 can be used to analyze a set of customer service inquiries and corresponding answers. The answers, and optionally the respective inquiries are vectorized using Vectorization Logic 122 and optionally processed using a natural language processor. The resulting vector space of answers is then examined to determine groupings of answers closer to each other than other answers. Groups of answers close to each other are assigned to a specific cluster. This process may be used to identify 10s or 100s of clusters. For example, in various embodiments at least 25, 50 or 100 clusters are identified in a set of customer inquiry answers. These clusters represent the grouping of answers according to their meaning and/or topic.

Expert Management System 105 optionally further includes Cluster Classification Logic 129. Cluster Classification Logic 129 is configured to classify clusters identified using Cluster Detection Logic 127. In some embodiments, clusters of inquiry answers are classified as being "informational answers" or "transaction answers." As used herein, these terms are meant to distinguish answers that require greater and lesser access to information or operational functions. For example, transactional answers may require confidential information or tools that are not available to external experts and/or end users. The distinction between informational and transactional answers may be implementation dependent. Examples of informational answers include referral to a webpage where information can be found, status of an airline flight, a current price, product availability, office hours, available appointment times, software installation steps, and/or the like. Examples of transactional answers include a current account balance, financial transactions, change of address, order status, health data, and/or the like. In general, transactional answers typically require that the party providing the answer have access to tools or to confidential information, that is only available to a restricted group, e.g., trusted customer service employees at Contact Center 125. An answer that requires a tool that is internal to an enterprise may be considered a transactional answer based on this requirement. For example, a data access tool, a shipping initiation tool or a tool usable to change a shipping address may only be available to a restricted group of enterprise employees and any answer that requires use of these tools would be considered transactional. An inquiry regarding an account balance (confidential information) may not necessarily require a transactional answer, if an expert can provide an end user with instructions on how to login to the user's account and access their account balance themselves.

Classification of clusters can be automatic or human assisted. In human assisted classification of clusters, Cluster Classification Logic 129 is configured to select a sampling of inquiry answers from each cluster and present these to a human reviewer. The human reviewer indicates if the cluster represents informational answers or transactional answers. Typically, the sampling of inquiry answers is performed so as to include a representative sample over the vector space occupied by the cluster being classified. In various embodiments at least 3, 5, 10 or 15 answers are sampled, or any range there between.

Automated classification of clusters as including informational answers or transactional answers is possible if information regarding how each answer was obtained is available or if a trained (machine based) classifier is available. For example, if an answer includes a confidential account balance or requires that a customer service agent execute a query on confidential data, then the answer can be assumed to be a transactional answer. In a specific case, a customer service inquiry includes a request to transfer funds between accounts, to resolve this request a customer service agent accesses a privileged account interface and enters commands to execute the transfer. A log of this access and the transfer may be used to automatically identify the inquiry answer (in this case a transaction confirmation) as being a transactional answer. Any cluster including transactional answers is identified as a transactional cluster. Any cluster including only informational answers is identified as an informational cluster. A trained (machine based) classifier may be used for automatic classification, even if the trained classifier was trained on answers from a different industry and/or enterprise.

Customer service inquiries associated with answers that are members of a cluster are considered to be members of the same respective cluster. Classification of clusters as being transactional or informational means that the inquiries are inferred as requiring a transactional or informational answer. As described elsewhere herein, this inference can be used to facilitate training of an inquiry classifier and routing of new customer service inquiries.

Some exchanges between users of Client Devices 110 and customer service agents (or experts) include a conversation including multiple inquiries and answers. In these cases, the first inquiry in the conversation is optionally associated with all the answers and the entire conversation is assigned to a cluster classified as transactional, if any of the answers are transactional, e.g., require confidential, protected or unavailable information. As such, a customer service inquiry can be classified by all the answers (or a plurality of answers), which may be required to resolve the inquiry. In some embodiments, if a first answer in a conversation is transactional, then the inquiry is considered to require a transactional answer. Answers earlier in a conversation may have higher weight in determining if the inquiries that initiated the conversation requires a transactional answer, relative to answers later in the same conversation.

Expert Management System 105 further includes Matching Logic 155 configured to match customer service inquiries to human experts. The matching is optionally based on at least a score of one of the human experts and a correlation between the topic characteristics of the inquiry (e.g., as determined by Inquiry Parser 140) and the specialty characteristics of the human expert. The expert score considered in matching is optionally specific to the topic characteristics and/or cluster of the inquiry. For example, an expert may have a plurality of scores associated with different clusters of customer service inquiries, e.g., relatively higher scores related to computer networking as compared to spider identification. Matching Logic 155 may be configured to match inquiries to internal and/or external experts.

Expert Management System 105 further includes Scoring Logic 160 configured to calculate expert scores and to associate these scores with the corresponding experts. As discussed elsewhere herein, scores are based, for example, on the historical performance of an expert.

Expert Management System 105 further includes Routing Logic 165 configured to route customer service inquiries to experts matched to the inquiries by Matching Logic 155. In some embodiments, Routing Logic 165 is configured to route the customer service inquiry to one of Expert Devices 115 and then further communication related to resolution of the inquiry occurs directly between the one of Expert Devices 115 and the originating member of Client Devices 105 (e.g., the member of Client Devices from which the inquiry originated). In some embodiments, Routing Logic 165 is configured to route the customer service inquiry to one of Expert Devices 155 and then route a response from the one of Expert Devices 115 back to the originating member of Client Devices 105. In these embodiments, Routing Logic 165 may route multiple communications between these devices to resolve a customer service inquiry.

In various embodiments, Routing Logic 165 is configured to route customer service inquiries to more than one expert (associated with more than one of Expert Devices 115). This can occur in various ways. For example, a customer service inquiry may be routed to different experts in a serial manner if a first expert, or set of experts, is unable to provide a satisfactory resolution for a customer service inquiry. The lack of a satisfactory resolution may be determined by the originator of the inquiry (requester) and/or by an elapsed time. A customer service inquiry may be routed to different experts in a serial manner if a first expert (or set of experts) refers the inquiry to a second expert. The second expert may take over responsibility for resolving the inquiry alone, or may work with the first expert to jointly resolve the inquiry. In one example, a response(s) produced by one set of experts may be given to a second set of experts for rating or to provide further input. Optionally, separate responses to an inquiry are provided by different sets (e.g., teams or groups) of experts.

Routing Logic 165 is optionally configured to route customer service inquiries to Contact Center 125. This can occur, for example, if an expert refers the service inquiry to Contact Center 125, if an expert is unable to resolve an inquiry to a requester's satisfaction, if an inquiry is not resolved within a predetermined time period, if no expert having needed specialty characteristics is available, if topic characteristics of the inquiry require confidential account data not available to experts, and/or the like.

In some embodiments, Routing Logic 165 (or Matching Logic 155) is configured to consider a customer service inquiry (including content, requester profile, requester activity, expert activity, etc.) and three possible resource types to resolve the inquiry. The resource types can include 1) Automated answers, external experts and internal experts. Routing Logic 165 or Matching Logic 155 is optionally configured to determine which types are most useful/efficiently used. This determination can rely on either binary rules: i.e., don't use community members for password questions, don't use automated responses if the questions has high emotional context; don't use community members for password questions that are expected to require transactional answers; or by probabilistic rules: i.e. use an automated response if confidence >90%, or use a community member (external expert) if they've successfully answered over 50% of questions that look like this. The resources used to resolve a customer service inquiry can include more than one resource type. For example, all three types of resources may be used serially or in parallel. As is discussed elsewhere herein, the three types of resources may use a common communication channel and/or user interface.

In some embodiments, Routing Logic 165 is configured to prevent routing of customer service inquiries including confidential information to external experts. For example, inquiries including an account number, social security number, telephone number, or any of the other personal/private information discussed herein, are optionally always routed to an internal expert. Inquiry Parser 140 is optionally configured to identify which customer service inquiries are likely to require the use of confidential information and Routing Logic 165 can then route those inquiries to internal experts. For example, an inquiry that requests a change in mailing address or customer authentication may be directed to internal experts rather than external experts.

In various embodiments Routing Logic 165 includes a classifier configured to classify customer service inquiries as (in the alternative) requiring transactional answers or not requiring transactional answers, e.g., as requiring transactional answers or optionally being resolved using merely informational answers. This classifier is optionally a binary classifier such as a Gradient Boosting classifier or a Multi- Layer Perceptron (or an alternative suitable Machine Learning model). The classifier is optionally trained using clusters of answers determined using Cluster Classification Logic 129 as discussed elsewhere herein. The classifier receives a customer service inquiry and outputs an expected answer classification. The classification can then be used to determine where to route the customer service inquiry. For example, a customer service inquiry classified as requiring a transactional answer is preferable routed to Contact Center 125 for resolution by a trusted customer service agent who has access to confidential information needed to provide an answer. (In some cases, an inquiry thus classified may be routed to an especially trusted expert associated with one of Expert Devices 115, who is given access to confidential data.) A customer service inquiry classified as only needing an informational answer (e.g., not needing confidential information for resolution) may be routed to one of Expert Devices 115 associated with an expert selected based on other criteria discussed herein.

The classifier configured to classify customer service inquiries as requiring transactional answers or not requiring transactional answers may be used in any of the steps including routing discussed herein.

In some embodiments, Matching Logic 155 is configured to match customer services requests an Automated Response Logic 190. Automated Response Logic 190 is configured to provide at least part of a response without further human intervention, e.g. to provide an "automated response." Automated Response Logic 190 is discussed elsewhere herein. Customer service inquiries may be routed to Automated Response Logic 190 in series or in parallel to internal and/or external experts. Once matched to Automated Response Logic 190, inquiries can be routed to Automated Response Logic 190 by Routing Logic 165. Automated Response Logic 190 is optionally configured to access confidential information and, thus, provide transactional answers. These answers may be hidden from an expert that provides other answers in response to the same customer service inquiry. For example, in a conversation involving multiple answers and inquiries, an expert may provide informational answers while Automated Response Logic 190 provides transactional answers.

Matching Logic 155 may be configured to match a customer service inquiry to Automated Response Logic 190 based on availability of internal experts, availability of external experts, an estimate that the Automated Response Logic 190 can contribute to a helpful response, and/or the like. For example, a lack of internal and/or external experts may increase the likelihood that a particular customer service inquiry is matched and subsequently routed to Automated Response Logic 190.

Matching Logic 155 and/or Routing Logic 165 optionally includes a machine learning system, e.g., a neural network or artificial intelligence system, configured to match and/or route customer service inquiries. As used herein, "machine learning system" is meant to include actual machine learning systems and/or other types of Bayesian/neural network/artificial intelligence systems. The machine learning system can include hardware, firmware, and/or software stored on a computer readable medium, and is optionally configured to be trained using training data to produce desired functionality. These requests may be routed to internal experts, external experts, automatic response systems (e.g., Automated Response Logic 190), or any combination thereof.

Expert Management System 105 optionally further includes Acceptance Logic 157. Acceptance Logic 167 is configured to accept a subset of received customer service inquiries for processing by one or more external experts and/or by Automated Response Logic 190, e.g., by a first human expert and a trained machine learning system. The acceptance may be based on availability of the first human expert and predicted probabilities that the first human expert will be able to resolve each member of the subset of inquiries. Typically, Acceptance Logic 167 is configured to consider the probabilities that any one or combination multiple external human experts will be able to resolve each customer service inquiry. Resolution of a customer service inquiry may require a predicted response score of a predetermined level.

The probability that a customer service inquiry can be resolved is optionally determined in real-time as customer service inquiries are received. In some embodiments, Acceptance Logic 157 is configured to compare an estimated probability of resolution for each of the inquiries to a threshold probability. Customer service inquiries that are not accepted are optionally directed to Contact Center 125.

Expert Management System 105 optionally further includes Training Logic 147. Training Logic 147 is configured to train an artificial intelligence system and/or other machine learning systems, including those that are optionally included in Automated Response Logic 190, Acceptance Logic 157, Cluster Detection Logic 127, Matching Logic 155, Inquiry Parser 140, and/or Routing Logic 165. Training Logic 147 is configured to train these machine learning systems based on customer service inquiries, responses to these customer service inquiries, and/or scores generated using Scoring Logic 160 and associated with respective member if the responses.

Specifically, Training Logic 147 is optionally used to train a machine learning system of Acceptance Logic 157, the machine learning system being configured to determine if a particular customer service inquiry should be accepted by Expert Management System (or alternatively directed to a Contact Center 125 associated with Enterprise 130). Such training can be based on scores generated by Scoring Logic 160 for responses generated by Expert Management System 105 and optionally scores for responses generated from answers generated by Contact Center 125.

Training Logic 147 is optionally used to train a machine learning system of Routing Logic 165 that is configured to determine if a customer service inquiry should be routed to both Automated Response Logic 190 and one or more human experts; routed to Automated Response Logic 190 or (alternatively) one or more human experts; routed to an internal expert and/or an external expert; routed to multiple human experts; routed to a specific human expert; and/or any combination thereof.

In some embodiments Training Logic 147 is configured to train a binary classifier configured to classify customer service inquiries as transactional or informational inquiries. This binary classifier is optionally part of Routing Logic 165. For example, Training Logic 147 may be configured use customer service inquiries and answers that have been assigned to clusters using Cluster Classification Logic 129 to train a classifier. Specifically, clusters of classified inquiries and inquiry answers can be provided to a neural network, or other machine learning system, in order to train the neural network (or other machine learning system) to distinguish inquiries that require transactional or informational answers. This classifier is trained to receive a customer service inquiry and to provide an expected answer classification (transactional or informational) as output.

In some embodiments, Expert Management System 105 further comprises Automated Response Logic 190. Automated Response Logic 190 includes hardware, firmware and/or software statically stored on a computer readable medium. Automated Response Logic 190 is configured to generate an automated response to a customer service inquiry. As used herein, an "automated response" is a response that is generated automatically by computer, e.g., without a need for real-time human input. Typically, an automated response is provided as an attempt to resolve a customer service inquiry prior to forwarding the inquiry to a human expert. For example, Routing Logic 165 may be configured to route a customer service inquiry to one of Expert Devices 115 only if the automated response does not satisfy the requester of the customer service inquiry.

As noted herein, Automated Response Logic 190 optionally includes an artificial intelligence, neural network, expert system, or other machine learning system. These systems are configured to provide complete and/or partial responses to customer service inquiries based on trained parameters. For example, a machine learning system may be trained to generate coefficients that optimize a desired outcome using training data. In typical embodiments, one desired outcome is responses that result in high scores as determined using Scoring Logic 160. Another possible desired outcome is efficient (e.g., cost effective) use of human experts and computing resources. Training data provided to Training Logic 147 to train machine learning system(s) of Automated Response Logic 190 (or any other logic discussed herein) is optionally selected based on response scores. For example, responses produced by human experts may be divided into subsets having relative higher and lower scores. Those with higher scores typically represent preferred (or affirmative) training data. Those with lower scores may represent negative training data, e.g., training data that represents a less desirable outcome.

Figure 2:
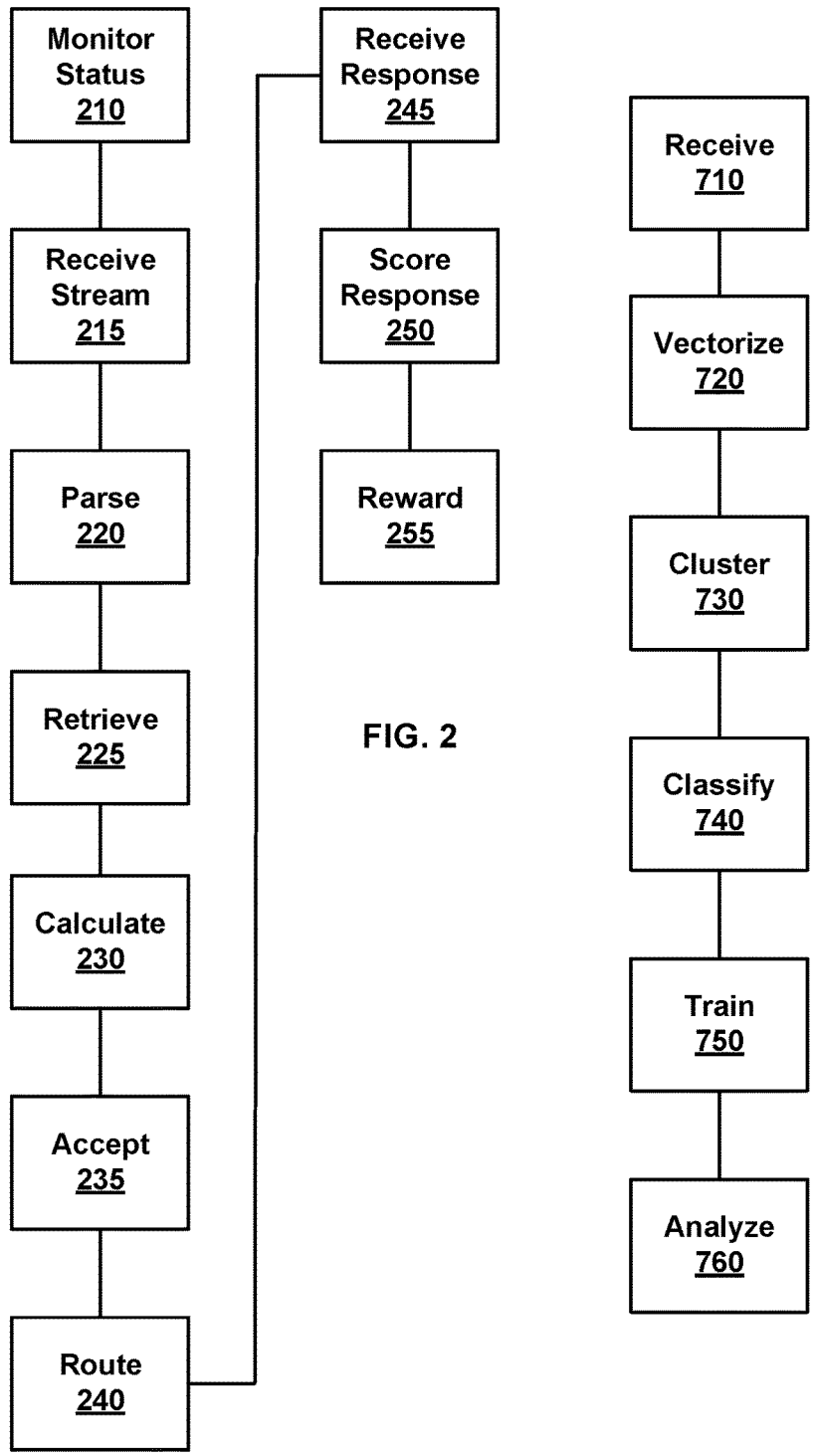
FIG. 2 illustrates a method of processing a customer service inquiry, according to various embodiments of the invention.

FIG. 2 illustrates a method of processing a customer service inquiry, according to various embodiments of the invention. These methods are optionally performed using Expert Management System 105. When a stream of customer service inquiries is received from Client Devices 110 the methods of FIG. 2 may be used to determine which of the inquiries should be accepted and processed by Expert Management System 105 and which are better resolved at Contact Center 125 (optionally under control of Enterprise 130).

In a Monitor Status Step 210 the status of a plurality of human experts is monitored. This step is optionally performed using Status Logic 145. The status can include whether a particular human expert is connected to Expert Management System 105 via one of Expert Devices 115, whether the expert is currently engaged in responding to customer service inquiries, the specialty characteristics of available internal and external experts, and/or the like.

In a Receive Stream Step 215 a stream of customer service inquiries is received. These are typically received from Client Devices 110 via Network 120. In some embodiments, some of the customer service inquiries are received from Enterprise 130 and/or Contact Center 125.

In an optional Parse Step 220 each member of the customer service inquiries is parsed. Typically, the parsing is performed using Inquiry Parser 140. The parsing is configured to determine one or more topic characteristics for each of the customer service inquiries. The parsing may also be used to identify metadata associated with the customer service inquiries.

In an optional Retrieve Step 225 data regarding each of the plurality of experts is retrieved from data storage. The retrieved data can include specialty characteristics, expected rewards, location, communication bandwidth, expert scores, and/or the like, regarding each of the plurality of experts.

In a Calculate Step 230 a probability that each (or any) of the plurality of experts can resolve each of the customer services inquiries is calculated. The calculation is optionally based on the topic characteristics of each inquiry, the specialty characteristics of each of the plurality of experts, and/or other data related to the human experts. In some embodiments, Calculate Step 230 includes a calculation of a probability that an automated response system, e.g., Automated Response Logic 190, will be able to answer each of the customer service inquiries, respectively.

In an Accept Step 235, a subset of the plurality of inquiries is accepted. In some embodiments, the subset is selected by comparing 1) a threshold and 2) the calculated probability of each inquiry being resolved by a human expert (e.g., by members of the plurality of experts). In other embodiments, the subset is selected by comparing 1) a threshold and 2) the calculated probability of each inquiry being resolved by Automated Response Logic 190 (or some other automated response system). A machine learning system, included within Acceptance Logic 157, may be applied to each customer service inquiry and data characterizing members of the plurality of experts retrieved in Retrieve Step 225. Accept Step 235 is optionally performed using Acceptance Logic 157.

In a Route Step 240 each member of the subset accepted in Accept Step 235 is routed to at least one of the plurality of experts and/or automatic response logic, e.g., Automated Response Logic 190. Route Step 240 is optionally performed using Routing Logic 165, as discussed elsewhere herein. Routing Logic 165 may use a trained machine learning system for this purpose. For example, Routing Logic 165 can include a binary classifier trained using clusters identified by Cluster Classification Logic 129 as described elsewhere herein. This binary classifier may be used to route an inquiry to any combination of Automated Response Logic 190, Expert Device 115A, and/or Contact Center 125. In some embodiments, an inquiry is predicted to require one or more transactional answer and one or more informational answer. In this case, the transactional answers may be provided by Automated Response Logic 190 and/or Contact Center 125, while the informational answers are provided by Expert Device 115A. Alternatively, transactional answers may be provided by Automated Response Logic 190 while informational answers are provides by Expert Device 115A.

In an optional Receive Response Step 245, a response to one or more members of the subset of the plurality of inquiries is received. The response may be a complete response or a partial response. For example, the response may be a complete response that is ready to be provided to a requester; or the response may be a partial response including content received from one or more of the plurality of experts and/or received from Automated Response Logic 190. Complete responses may be automatically communicated to a requester. As is discussed elsewhere herein, a response may include contributions from both human expert and automated systems. A human expert may modify a partial response provide by an automated system. Completed responses are optionally sent directly to request sources, e.g., sent to Enterprise 130, Contact Center 125, and/or members of Client Devices 110. Partial responses are not typically sent directly to Client Devices 110, although they may be sent to Enterprise 130 and/or Contact Centers 125 for modification and/or approval.

In an optional Score Response Step 250, the response received in Response Step 245 is scored using Scoring Logic 160. The scoring can be based on any of the criteria discussed herein with regard to Scoring Logic 160. In some embodiments, separate scores are calculated for contributions of different human experts and/or Automated Response Logic 190. Both human and/or automated contributions to a response may be scored. The scores are typically intended to be a measure of a quality of the response.

In an optional Reward Step 255, a reward is provided to one or more of the plurality of experts. The reward is compensation for contributing to a response to one of the subset of customer service inquiries. The reward is optionally a financial reward. The reward may be for contributing all or part of a response. More than one of the plurality of experts may receive a reward for contributing to the same response. In some embodiments, the reward is made for a contribution to response content that is later provided by Automated Response Logic 190. For example, a first human expert may contribute to a response to a first customer service inquiry. The first human user can receive a reward for this contribution, e.g., based on a good score etc. That contribution can then be incorporated in a response stored in Automated Response Data 195 for later use by Automated Response Logic 190. When the stored response is later used (again) by Automated Response Logic 190, the first human expert can then receive an additional reward for the later use of the contribution. The first human expert can receive repeated rewards (2 or more) for a contribution that is used repeatedly (2 or more times) to respond to customer service inquiries from different sources, e.g., different members of Client Devices 110.

Figure 3:
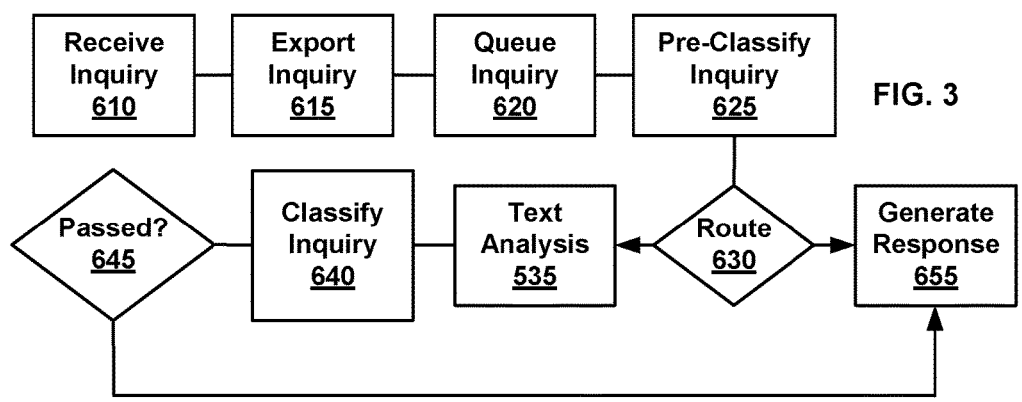
FIG. 3 illustrates methods of processing customer service requests, according to various embodiments of the invention.

FIG. 3 illustrates methods of processing customer service requests, according to various embodiments of the invention. The machine learning system may be included in Cluster Detection Logic 127, Automated Response Logic 190, Matching Logic 155, and/or Routing Logic 165.

In a Receive Inquiry Step 610, a customer service inquiry is received at Contact Center 125. At Contact Center 125 the inquiry may be resolved if human agents are available. Alternatively, in an Export Inquiry 615 Step 615 the customer service inquiry is sent to Expert Management System 105 from Contact Center 125.

In a Queue Inquiry Step 620, the customer service is placed in a queue for processing. This queue is optionally within part of Inquiry Storage 137.

In a Pre-Classify Inquiry Step 625, the customer service inquiry is pre-classified into several alternative groups. These groups include, for example, "foreign language," "incomplete inquiry," "test sample," "reject," "expect negative score," and/or "answerable." A question that is in a foreign language may or may not be answerable if an expert is available with appropriate language skills, if the inquiry can be reliably translated, or if Automated Response Logic 190 and Routing Logic 165 have been trained in the language of the customer service inquiry. An inquiry may be incomplete if it does not have enough content for processing, e.g., includes merely "brown fox jumped." Customer service inquiries designated as "test samples" are used to test processing of inquiries by Expert Management System 105. These inquiries are optionally randomly selected and can include less than 10, 5 or 1% of received inquiries. "Rejected" customer service inquiries are returned to Contact Center 125 for processing. "Answerable" customer service inquiries are those predicted to have a good probability to result in a favorable response. Classification of an inquiry as "answerable" may depend on the experts that are currently available, on a probably calculation performed by Matching Logic 155 or Routing Logic 165, and/or the like. In some embodiments, a probability of a response score above a specified threshold is calculated, and "answerable" inquiries must have a calculated probability above a predetermined threshold. The calculated probability is optionally dependent on classification of the customer service inquiry in a specific cluster.

If the expert system training includes the use of negatively scored responses, then those with expected negative scores are optionally also accepted for processing.

Pre-Classify Inquiry Step 625 may be performed by Cluster Detection Logic 127, Matching Logic 155, Routing Logic 165, and/or Inquiry Parser 140.

In a Route 630 the customer service inquiry is routed according to the pre-classification of Step 625. Inquiries classified as "sample" are routed to a Generate Response Step 655, in this step a response is generated by Expert Management System 105 optionally using the systems and methods described herein. The resulting response can then be scored using Scoring Logic 160. Test samples are useful to detect changes in the capabilities of Expert Management System 105. For example, the addition of new external or internal experts may mean that a customer support inquiry that previously was unanswerable can now receive response having a satisfactory score.

Inquiries classified as "answerable" are processed using the elements of Expert Management System 105 to generate a response, as described elsewhere herein. This optionally includes Text Analysis Step 535 in which the text of the customer service inquiry is processed as described elsewhere herein. Note that Text Analysis Step 535 optionally occurs prior to Pre-Classify Inquiry Step 625, and may be performed using Inquiry Parser 140 and/or Cluster Detection Logic 127.

In a Classify Inquiry Step 640 the customer service inquiry is classified to determine if it can be answered by Automated Response Logic 190, by an internal expert, and/or by an (available) external expert. This classification optionally uses the various machine learning systems discussed elsewhere herein, for example, a machine learning system trained using the methods of FIG. 5. Classify Inquiry Step 640 optionally uses information calculated in Pre-Classify Inquiry Step 625. In some embodiments, this information is sufficient and no further classification is needed in Classify Inquiry Step 640.

Pre-Classify Inquiry Step 625 and/or Classify Inquiry Step 640 optionally include classification of a customer service inquiry based in whether a transactional answer is or is not expected to be required to resolve the inquiry. This may be performed using Routing Logic 165 trained using clusters of answers identified and classified using Cluster Detection Logic 127 and Cluster Classification Logic 129.

In a Passed? Step 645 customer service inquiries are routed to Generate Response Step 655 if an acceptable response can be expected according to Classify Inquiry Step 640 (or Pre-Classify Inquiry Step 625). If negative responses are used in training, some customer service inquiries for which poor responses are expected may also be routed to Generate Response Step 655. Inquiries not routed to Generate Response Step 655 are optionally returned to Contact Center 125. Note that the ability to generate satisfactory responses to a customer service inquiry may change with time as expert availability changes. Generated responses are typically provided to a source of the customer service inquiry.

FIG. 4 illustrates methods of training an inquiry classifier, according to various embodiments of the invention. The inquiry classifier is trained to predict a probability that a customer service inquiry will require confidential information to generate an answer that adequately resolves the inquiry, e.g., that the inquiry will or will not require a transactional answer. The trained inquiry classifier is optionally part of Routing Logic 165, as discussed elsewhere herein. The trained inquiry classifier may be used in routing customer inquiries as described elsewhere herein.

In some embodiments, data (customer service inquiries and associated answers) used to train the inquiry classifier comes from an enterprise and/or industry different from that for which inquiries are later classified. For example, sets of inquiries and answers from enterprises in automotive and airline industries may be used to train a classifier that is later used to classify customer service inquiries in the banking industry. Training data may come from multiple industries and/or enterprises.

The training of the inquiry classifier is optionally ongoing. For example, once initially trained using a first set of inquiries and associated answers, the classifier may be retrained using new inquiries and associated answers. The new inquiries and answers optionally being from a different source, for example from a different enterprise and/or industry.

In a Receive Step 710, a plurality of customer service inquiries and answers to the customer service inquiries are received. Optionally, one or more of the customer service inquiries are part of a conversation that included multiple inquiries and answers. The received inquiries and answers can be received from multiple sources, e.g., enterprises in the same or different industries. In some embodiments the received answers include log data regarding actions that were taken to generate the answers. For example, whether an answer was generated using auto response logic; was a confidential database accessed to generate the answer; did the answer include an account number, account balance, a transaction receipt, etc.; was the inquiry associated with the answer passed from an external expert to a contact center; and/or the like. In another example, if the source of an answer is an external expert, then the answer can be assumed to be informational. Receive Step 710 is optionally performed using Network 120 and/or Request I/O 135.

In a Vectorize Step 720, the answers are vectorized (turned into vector representations). Likewise, the associated inquiries are also vectorized. Vectorize Step 720 is optionally performed using Vectorization Logic 122. The inquiries and answers are vectorized in metric (vector) spaces in which a distance between answers is representative of their similarity.

In a Cluster Step 730, the vectorized answers are clustered based on their relative distances, e.g., cosine distance. Cluster Step 730 can include identification of at least at least 25, 50 or 100 clusters. Cluster Step 730 is optionally performed using Cluster Detection Logic 127. Each of the clustered answers are associated with one or more customer service inquiry.

In a Classify Step 740, the clusters of answers identified in Cluster Step 730 are classified based on the types of information or tools needed to generate the answers in each respective cluster. For example, answers can be classified based on availability and/or confidentiality of data required to generate the answer, or based on authority to perform a task. Answers can be classified as either being transactional or informational.

Classify Step 740 is optionally performed using Cluster Classification Logic 129. In some embodiments classification of at least some clusters is automatic. For example, a cluster having one or more answer including an account balance and/or a receipt for a transaction (e.g., refund) may be classified as transactional. Likewise, a cluster having merely answers with internet links to publicly available help pages may be classified as informational or "non-transactional." A cluster having merely answers received from external experts may, likewise, be classified as informational or "non-transactional." Data regarding the generation of answers received in Receive Step 710 (e.g., which data records were accessed to generate an answer) is optionally used for the automatic classification of clusters. In some embodiments, if at least one answer in a cluster is a transactional cluster, then the entire cluster is considered transactional. In some embodiments, a threshold percentage of answers within a cluster must be transactional before the cluster is considered to be transactional as a whole.

In some embodiments, Classify Step 740 is performed by presenting representative answers to a human classifier who uses a computer interface to indicate a classification for each answer, e.g., indicates if the answer being considered is transactional or informational. The human reviewer may be provided with at least 3, 5, 9 or 13 representative answers from a cluster to make this classification for the answers. The cluster in its entirety is then classified based on the representative answers. In some embodiments, the human review is not an expert in particular subject matter of the answers, as the classification need not require a deep expertise of the subject matter. In some embodiments, Classify Step 740 is performed using a previously trained inquiry classifier. As noted elsewhere herein, this previously trained classifier may have been trained on inquiries and answers in a different industry and/or inquiries directed at a different enterprise.

In a Train Step 750, an inquiry classifier is trained to predict if a newly received customer service inquiry will require one or more transactional answer to be resolved. This training may include providing a neural network with training data including vectorized inquiries and the cluster classification of clusters. The clusters being clusters of answers corresponding to the inquiries. For example, the input can include the classification of each cluster as transactional or instructional and the inquiries associated with answers included in each of the clusters. Train Step 750 is optionally repeated on a periodic basis, e.g., daily or weekly.

Following training of the inquiry classifier in Train Step 750 the inquiry classified is optionally used in Classify Step 740 at a later execution of the method.

In an optional Analyze Step 760 the trained classifier is used to determine predict a fraction of inquiries received by an enterprise are expected to require transactional answers. For example, a set of inquiries previously received by the enterprise may be provided to the trained classifier and the fraction of those classified as predicted to require transactional answers determined. This information may then be used to predict what fraction of future inquiries received by that enterprise are likely to require resolution at Contact Center 125 rather than merely being resolved by an external expert, e.g., by a user of Expert Device 115A.

The steps illustrated in FIG. 4 are optionally followed by other methods illustrated herein. For example, the trained classifier may be used to route customer service inquiries in Route Step 240 (FIG. 2) or Route Step 630 (FIG. 3). Thus, a step of receiving a customer service inquiry and classifying the received customer service inquiry using the inquiry classifier trained in Train Step 750 may follow. The customer service inquiry being classified, in the alternative, as requiring a transactional answer or not requiring a transactional answer. The customer service inquiry may then be routed to a customer service center (e.g., Contact Center 125) or an external expert at Expert Device 115A, responsive to the classification. The inquiry is routed to a customer service center or automated response system if the customer service inquiry is classified as requiring a transactional answer, and routing the received customer service inquiry to a human expert external to the customer service center if the received customer service inquiry does not require a transactional answer.

Several embodiments are specifically illustrated and/or described herein. However, it will be appreciated that modifications and variations are covered by the above teachings and within the scope of the appended claims without departing from the spirit and intended scope thereof. For example, while the examples provided herein are directed at "customer" inquiries, the disclosed systems and methods may be applied to inquiries from entities other than customers. For example, business to business service inquiries or inquiries made to government entities. Likewise, while customer service inquiries are used as an example herein, the disclosed system and methods may be applied to various types of inquiries, e.g., inquiries for support, information, actions, sales, employment, service inquiries, and/or work requests (workflow). In some embodiments service inquiries are internal to an enterprise. For example, the systems and methods described herein may enhance communication within an enterprise or enterprise social network.

Further, while customer service is used as an example herein, the systems and methods described can easily be adapted to other tasks. For example, a community of external experts (and optional machine learning systems), may be used to approve expenses, approve advertisements, grade schoolwork, review applications (for jobs, permits, government programs, credit, licenses, grants, admission, insurance, loans, financial aid, etc.), approve advertisements, identify image contents, review content, classification, route work flow, complete forms, work completion, perform surveys, proofreading, and/or the like.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

What is claimed is:

1. An expert management system comprising:
   a request I/O configured to receive a customer service inquiry;
   an inquiry parser configured to determine one or more topic characteristics of the inquiry;
   expert data storage configured to store data characterizing one or more specialty characteristics of each of the plurality of experts;
   matching logic configured to match the inquiry to a first human expert of the plurality of human experts, the matching being based on a correlation between the topic characteristics of the inquiry and the specialty characteristics of the first human expert;
   routing logic configured to route the inquiry to the first human expert if the customer service inquiry is predicted to require merely an information answer and to route the inquiry to a customer contact center if the customer service inquiry is predicted to require a transactional answer, the routing logic including a classifier configured to classify the customer service inquiry as being predicted to require alternatively a transaction or an informational answer, wherein the customer service inquiry is applicable to a first enterprise and the classifier is trained using customer service inquiries from a second enterprise.

2. The system of claim 1, wherein generation of the transactional answer requires access to confidential user information.

3. The system of claim 1, wherein the classifier includes a trained neural network.

4. The system of claim 1, wherein the first and second enterprise are in different industries.

5. A machine learning system comprising:
   an I/O configured to receive answers to customer service inquiries, each of the answers being associated with one or more customer service inquiries;
   cluster detection logic configured to identify clusters of the answers based on distance between the answers in a vector space;
   cluster classification logic configured to categorize each of the clusters of the answers based on presence or absence of transactional answers within each of the respective clusters; and
   training logic configured to train a classifier using the categorized clusters of answers, the classifier being trained to receive a customer service inquiry and to predict whether the customer service inquiry will require a transactional answer to be resolved.

6. The system of claim 5, further comprising vectorization logic configured to vectorize the answers.

7. The system of claim 5, wherein at least one of the customer service inquiries is associated with more than one answer and the at least one customer service inquiry is classified as requiring a transactional answer if any of the associated answers are transactional answers.

8. The system of claim 5, wherein the training logic is configured to train the classifier using inquiries received from multiple enterprises.

9. The system of claim 5, wherein the clusters of answers include answers and associated inquiries related to a first enterprise, and the customer service inquiry is directed to a second enterprise.

10. The system of claim 9, wherein the first and second enterprises are in different industries.

11. A method of training an inquiry classifier, the method comprising:
receiving, using a request I/O, a plurality of customer service inquiries and answers to the customer service inquiries;
vectorizing, using vectorization logic, the received answers in a vector space;
vectorizing, using the vectorization logic, the received inquiries in a vector space;
clustering the answers, using cluster detection logic, based on distances between the answers in the vector space to produce a plurality of answer clusters, each of the answers within a member of the plurality of answer clusters being associated with a respective customer service inquiry;
classifying each of the clusters, using cluster classification logic, as transactional or instructional clusters based on a nature of answers included with each of the clusters; and
training a classifier, using training logic, based on the classification of each cluster as transactional or instructional and the inquiries associated with answers included in each of the clusters.

12. The method of claim 11, further comprising receiving a customer service inquiry and classifying the received customer service inquiry using the classifier, the customer service inquiry being classified, in the alternative, as requiring a transactional answer or not requiring a transactional answer.

13. The method of claim 12, wherein the classifier is trained using customer service inquiries received from a first enterprise and the received customer service inquiry is received from a second enterprise.

14. The method of claim 12, further comprising routing the received customer service inquiry to a contact center if the customer service inquiry is predicted to require a transactional answer, and routing the received customer service inquiry to a human expert external to the contact center if the received customer service inquiry is not predicted to require a transactional answer.

15. The method of claim 12, further comprising routing the received customer service inquiry based on whether the customer service inquiry is predicted to require a transactional answer including confidential information.

16. The method of claim 11, wherein the classifier is trained to classify customer service inquiries, in the alternative, as requiring a transactional answer or not requiring a transactional answer.

17. The method of claim 16, wherein the classifier is trained to classify a customer service inquiry associated with multiple answers and to classify the customer service inquiry as requiring a transactional answer if any of the multiple answers are transactional answers.

18. The method of claim 11, wherein the classifier is trained to predict whether a customer service inquiry requires a transactional answer to be resolved.

19. The method of claim 11, wherein the classifier is re-trained on a periodic basis.

20. The method of claim 11, wherein clustering the answers produces at least 50 clusters of answers.

21. The method of claim 11, further comprising predicting a fraction of future inquiries received by an enterprise that will require transactional answers.

* * * * *